US012807075B2

(12) United States Patent
Chen

(10) Patent No.: US 12,807,075 B2

(45) Date of Patent: Nov. 24, 2026

(54) GLOVEBOX

(71) Applicant: GM Global Technology Operations LLC, Detroit, MI (US)

(72) Inventor: Shuguang Chen, Shanghai (CN)

(73) Assignee: GM Global Technology Operations LLC, Detroit, MI (US)

( * ) Notice: Subject to any disclaimer, the term of this patent is extended or adjusted under 35 U.S.C. 154(b) by 331 days.

(21) Appl. No.: 18/396,292

(22) Filed: Dec. 26, 2023

(65) Prior Publication Data

US 2025/0136005 A1 May 1, 2025

(30) Foreign Application Priority Data

Oct. 27, 2023 (CN) ......................... 202311412638.1

(51) Int. Cl.
*B60R 7/06* (2006.01)
*B60N 3/00* (2006.01)

(52) U.S. Cl.
CPC ................ *B60R 7/06* (2013.01); *B60N 3/002* (2013.01)

(58) Field of Classification Search
CPC .... B60R 7/06; B60R 2011/0005; B60N 3/002
USPC ..... 296/37.12, 37.8, 37.1, 24.34, 70, 73, 74; 312/325
See application file for complete search history.

(56) References Cited

U.S. PATENT DOCUMENTS

| | | | | | |
|---|---|---|---|---|---|
| 2,789,861 | A * | 4/1957 | Hudson | B60N 3/002 108/134 |
| 4,630,857 | A * | 12/1986 | Zweiniger | B60R 7/06 224/282 |
| 4,902,061 | A * | 2/1990 | Plavetich | B60N 3/102 296/37.12 |
| 5,558,385 | A * | 9/1996 | Gross | E05B 83/30 70/258 |
| 8,714,093 | B2 * | 5/2014 | Rigner | B60N 3/002 108/45 |
| 9,511,718 | B2 * | 12/2016 | Shibata | B60R 7/06 |
| 10,661,719 | B2 * | 5/2020 | McCarthy | B60N 3/08 |
| 11,731,548 | B2 * | 8/2023 | Park | B60N 3/002 296/37.12 |
| 2010/0148531 | A1 * | 6/2010 | Evans | E05B 83/30 16/277 |
| 2018/0361942 | A1 | 12/2018 | McCarthy et al. | |

FOREIGN PATENT DOCUMENTS

| | | | | |
|---|---|---|---|---|
| CN | 204296593 U * | 4/2015 | |
| CN | 206327273 U * | 7/2017 | |
| DE | 102011105035 A1 | 12/2012 | |
| DE | 102011118576 A1 * | 5/2013 | E05F 15/00 |
| DE | 202015102842 U1 | 8/2015 | |
| DE | 202022103992 U1 | 10/2022 | |
| GB | 2325441 A | 11/1998 | |
| JP | H07112643 A * | 5/1995 | |
| JP | 4271885 B2 * | 6/2009 | |

* cited by examiner

*Primary Examiner* — Amy R Weisberg
*Assistant Examiner* — Denise L. Esquivel
(74) *Attorney, Agent, or Firm* — Honigman LLP; Matthew H. Szalach

(57) ABSTRACT

A glovebox for a vehicle is disclosed. The glovebox includes a frame and a storage bin translatable between a first position and a second position relative to the frame. Additionally, the storage bin is also rotatable between a closed position and an open position relative to the frame.

11 Claims, 5 Drawing Sheets

FIG. 4
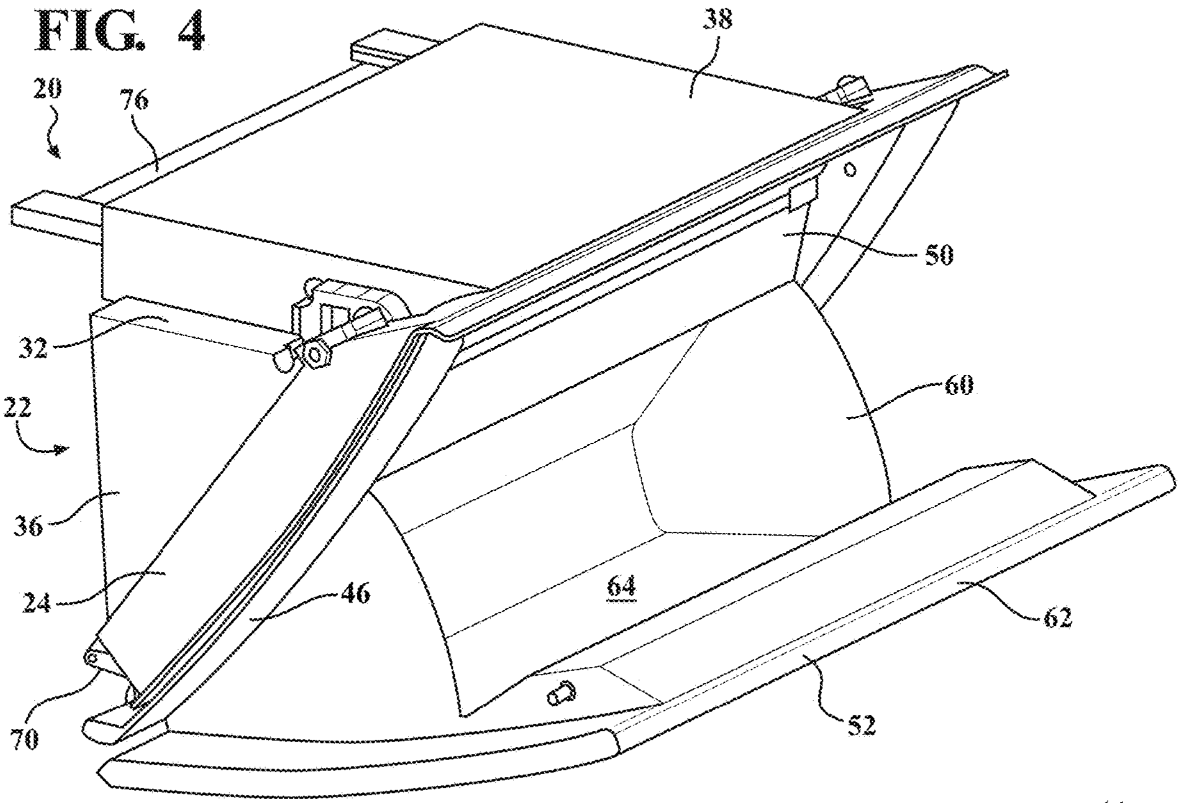
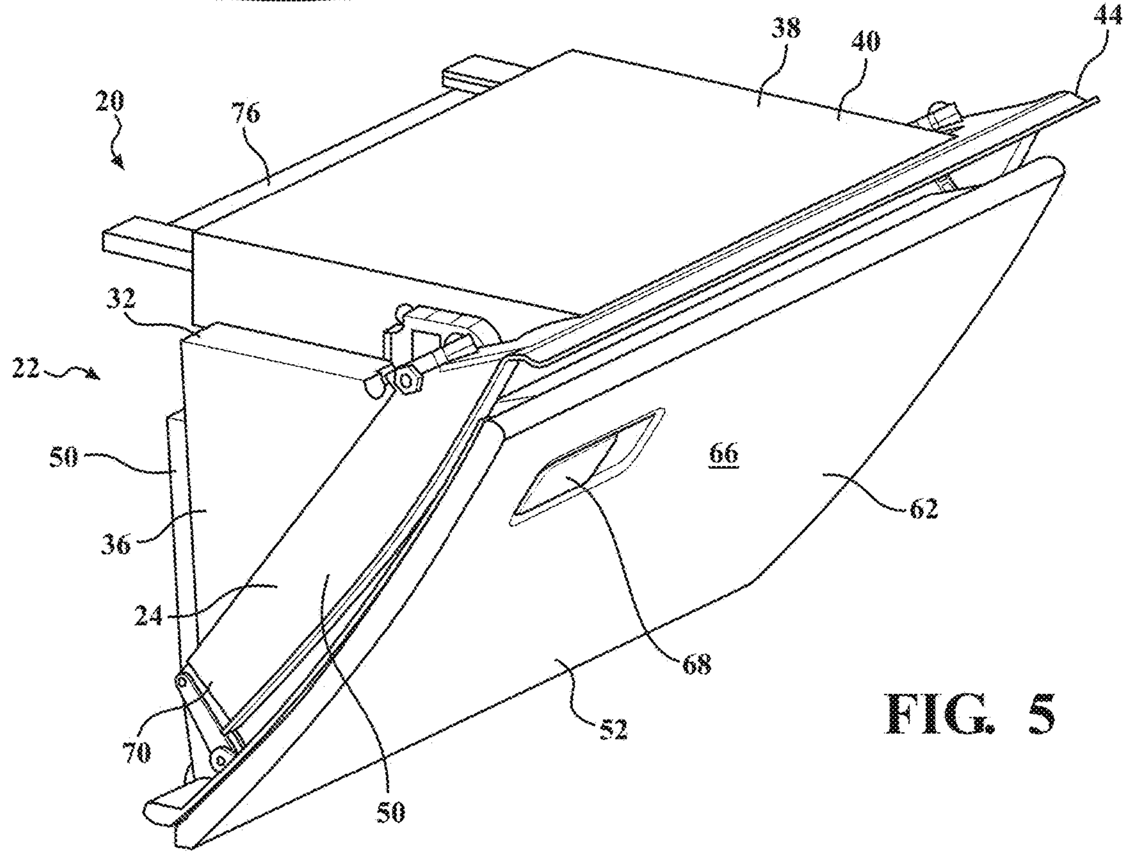
FIG. 5

FIG. 6
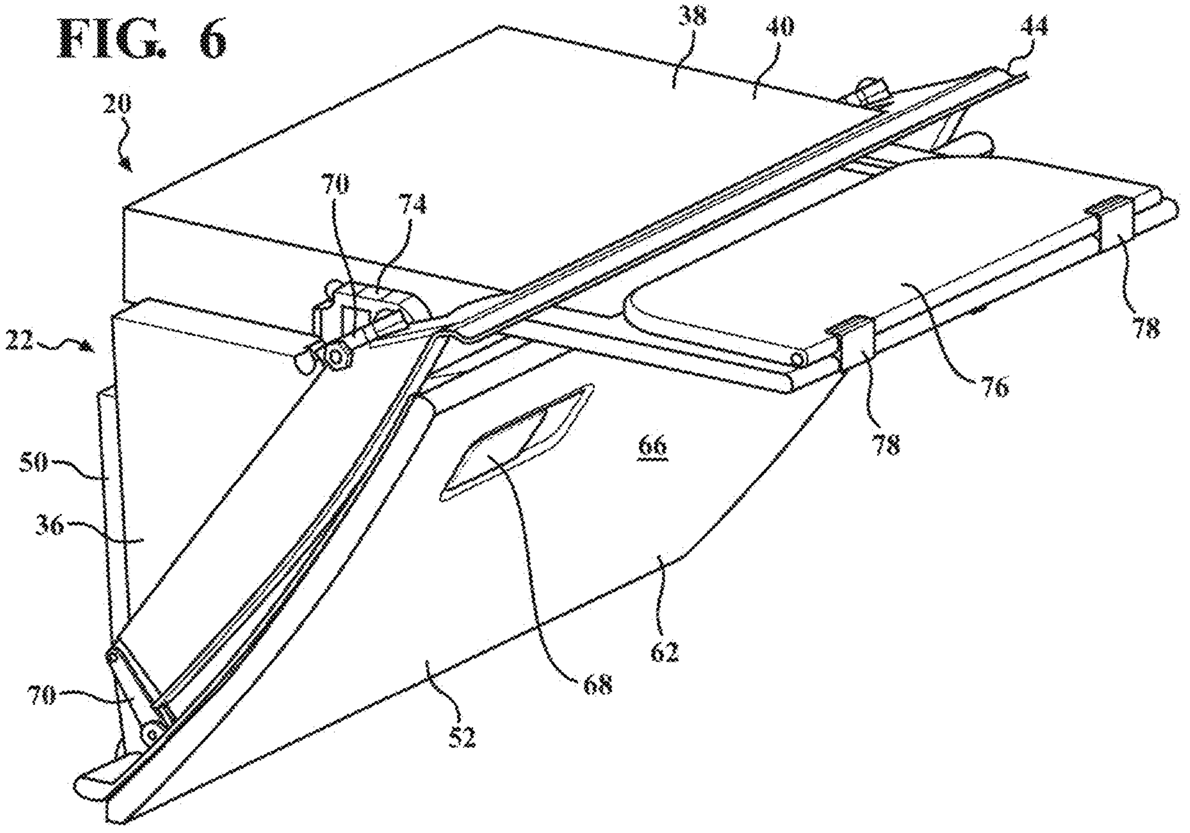
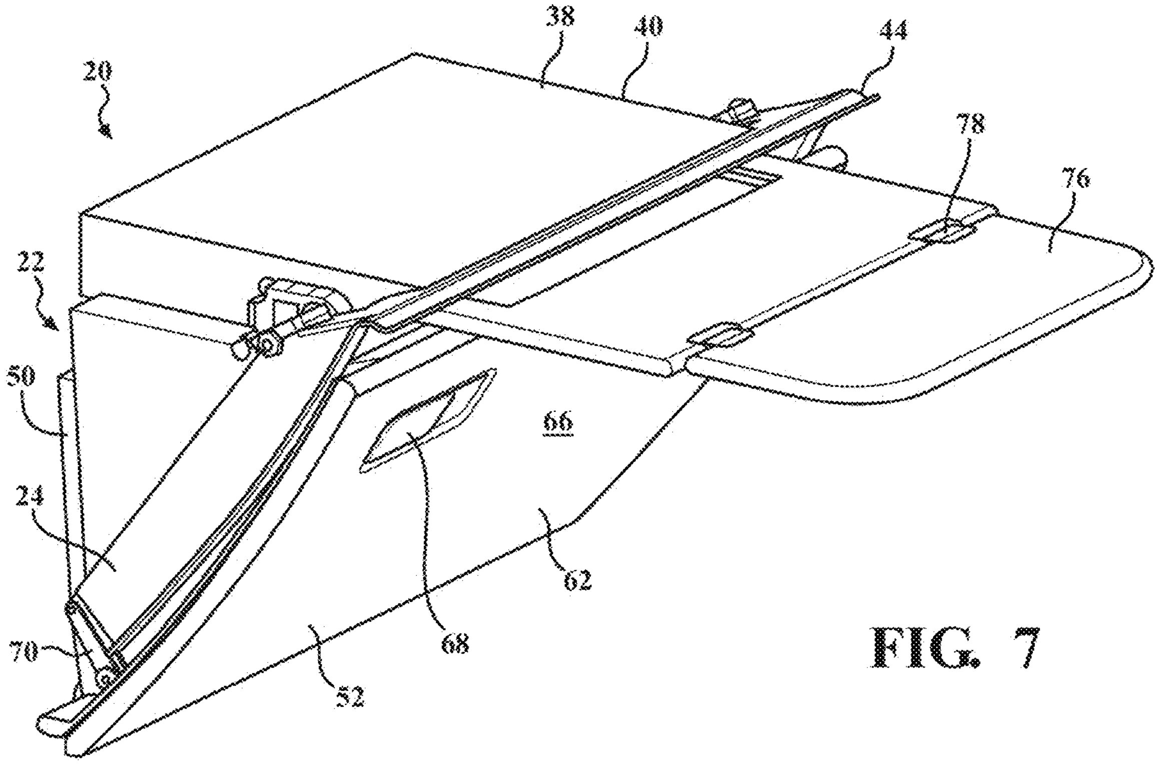
FIG. 7

GLOVEBOX

CROSS REFERENCE TO RELATED APPLICATIONS

This application claims priority to Chinese Application No. 202311412638.1, filed Oct. 27, 2023, the disclosure of which is incorporated herein by reference in its entirety.

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to a glovebox for a vehicle.

Vehicles often travel long distances to their desired destination. During these long distances, passenger comfort and convenience can greatly improve the passenger experience. Oftentimes, passengers desire to have a tray or other surface for working, eating, etc. available during travel. However, passengers may not have a need for a tray for the entire trip, therefore, a movable tray is desired.

Current movable trays are typically available for rear seat passengers and such trays are able to retract or rotate into the driver or front passenger vehicle seat. However, current movable trays are not compatible with front passengers as the design would require space in the instrument panel to store the tray when not in use. As the instrument panel is an important component of the vehicle needing space for various safety features, the current movable tray design is not able to be implemented for front passengers.

SUMMARY

In some examples, a glovebox for a vehicle includes a frame and a storage bin translatable between a first position and a second position relative to the frame. The storage bin is also rotatable between a closed position and an open position relative to the frame. In some examples, the storage bin is attached to the frame via a linkage configured to permit movement of the storage bin between the first position and the second position. Additionally, in some examples, the linkage includes a four-bar link. In some examples, the glovebox for the vehicle also includes a tray movable between a retracted state and an extended state, the tray extending from the frame in the extended state. In some examples, the tray is movable into the extended state when the storage bin is in one of the first position and the second position and is prevented from moving into the extended state when the storage bin is in the other of the first position and the second position. In some examples, the glovebox for the vehicle also includes a motor configured to move the tray between the extended position and the retracted position. In some examples, the tray includes at least one hinge configured to permit the tray to be folded on itself. Additionally, in some examples, the glovebox is incorporated into a vehicle.

In some examples, a glovebox for a vehicle includes a frame, a storage bin translatable between a first position and a second position relative to the frame, and a tray movable between a retracted state disposed within the frame and an extended state extending from the frame. The tray may be movable into the extended state when the storage bin is in one of the first position and the second position and prevented from moving into the extended state when the storage bin is in the other of the first position and the second position. Additionally, in some examples the storage bin is attached to the frame via a linkage configured to permit movement of the storage bin between the first position and the second position. In some examples the linkage includes a four-bar link. In some examples, the storage bin is rotatable relative to the frame between a closed position and an open position. Additionally, in some examples, the glovebox includes a motor configured to move the tray between the extended position and the retracted position. In some examples, the tray includes at least one hinge configured to permit the tray to be folded on itself. Additionally, in some examples, the glovebox is incorporated into a vehicle.

In some examples, a vehicle includes an instrument panel and a door rotatable relative to the instrument panel between a closed position restricting entry into a storage compartment and an open position permitting entry into the storage compartment. The door is also translatable between a first position and a second position relative to the instrument panel. Additionally, the vehicle includes a tray disposed within the instrument panel and movable between a retracted position disposed within the instrument panel and an extended position extending from the instrument panel. The tray is prevented from moving from the retracted position into the extended position by the door when the door is in one of the first position and the second position and permitted to move from the retracted position into the extended position when the door is in the other of the first position and the second position.

In some examples, the storage bin is attached to the instrument panel via a linkage configured to permit movement of the storage bin between the first position and the second position. In some examples, the linkage includes a four-bar link. In some examples, the vehicle also includes a motor configured to move the tray between the extended position and the retracted position. In some examples, the tray includes at least one hinge configured to permit the tray to be folded on itself.

BRIEF DESCRIPTION OF THE DRAWINGS

The drawings described herein are for illustrative purposes only of selected configurations and are not intended to limit the scope of the present disclosure.

FIG. 4 is a side perspective view of a glovebox having a storage bin in an open position according to the present disclosure;

FIG. 5 is a side perspective view of a glovebox having a storage bin in a second position according to the present disclosure;

FIG. 6 is a side perspective view of a glovebox having a tray in an extended position according to the present disclosure;

FIG. 7 is a side perspective view of a glovebox having a tray in an extended position according to the present disclosure;

Corresponding reference numerals indicate corresponding parts throughout the drawings.

DETAILED DESCRIPTION

Figure 1:
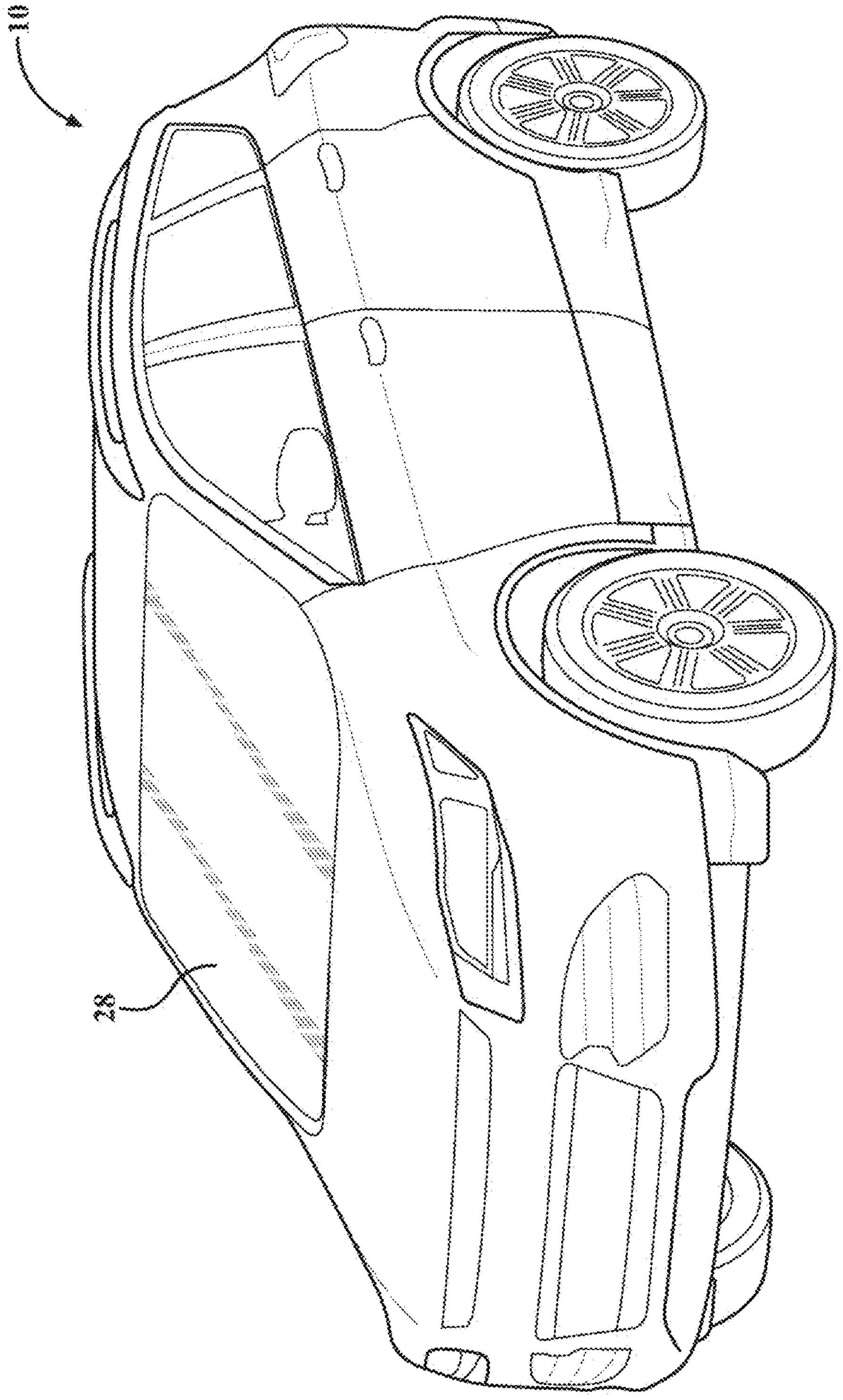
FIG. 1 is an exterior perspective view of a vehicle.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms "first," "second," "third," etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below, the term "module" may be replaced with the term "circuit." The term "module" may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term "code," as used above, may include software, firmware, and/or microcode, and may refer to programs, routines, functions, classes, and/or objects. The term "shared processor" encompasses a single processor that executes some or all code from multiple modules. The term "group processor" encompasses a processor that, in combination with additional processors, executes some or all code from one or more modules. The term "shared memory" encompasses a single memory that stores some or all code from multiple modules. The term "group memory" encompasses a memory that, in combination with additional memories, stores some or all code from one or more modules. The term "memory" may be a subset of the term "computer-readable medium." The term "computer-readable medium" does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICS (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

Figure 2:
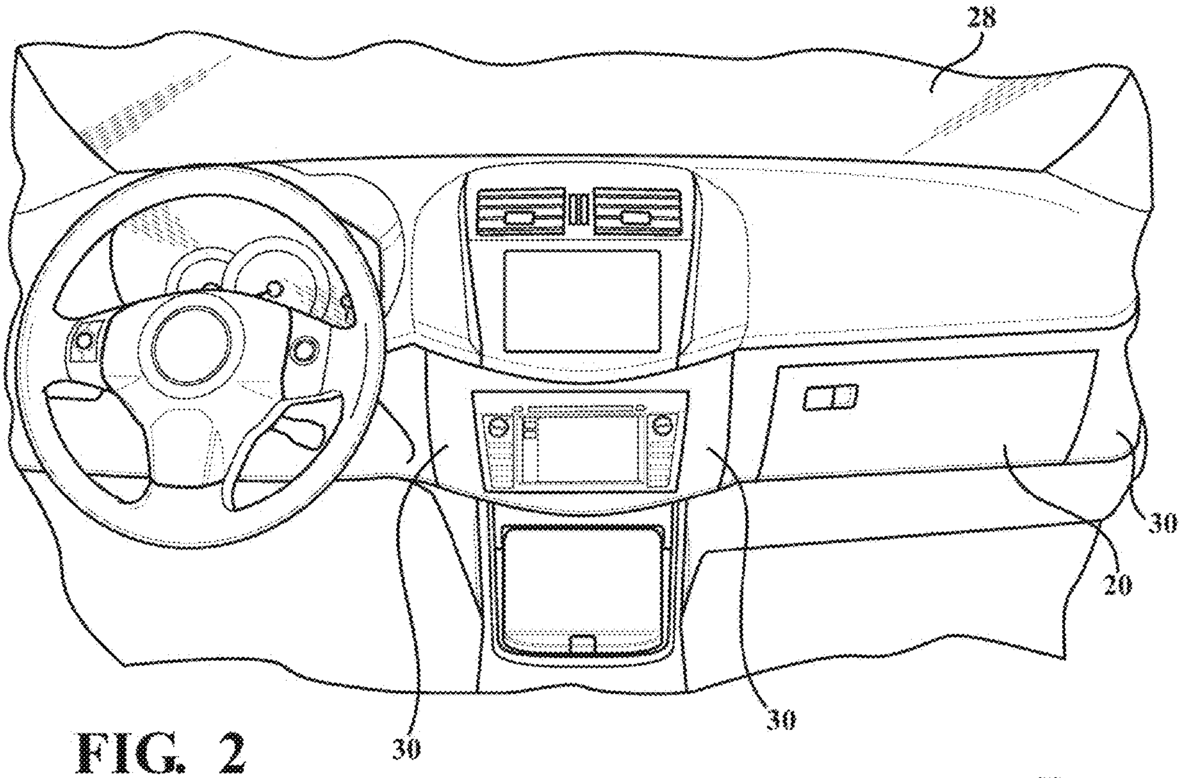
FIG. 2 is an interior perspective view of the vehicle having an instrument panel including a glovebox according to the present disclosure.
Figure 3:
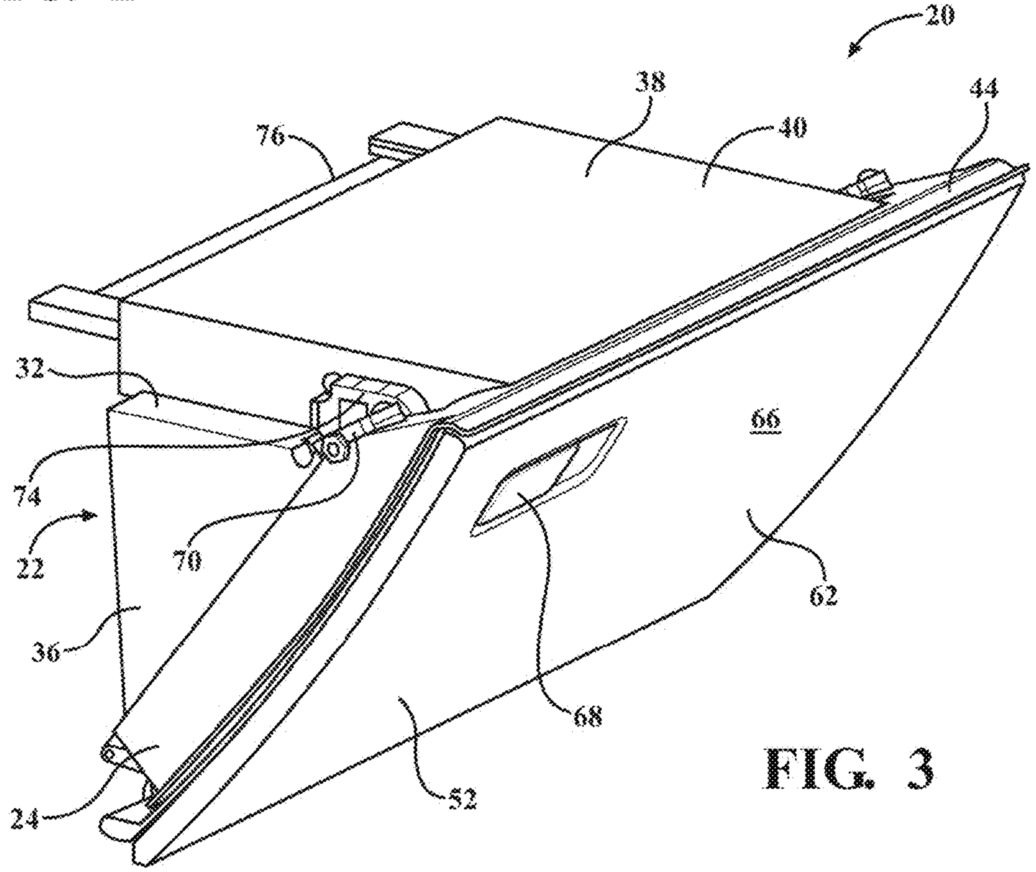
FIG. 3 is side perspective view of a glovebox according to the present disclosure.
Figure 8:
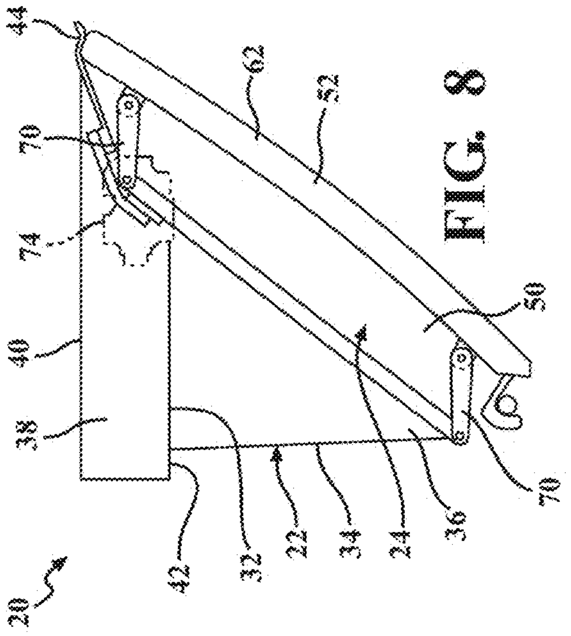
FIG. 8 is side plan view of a glovebox having a storage bin in a first position according to the present disclosure.
Figure 9:
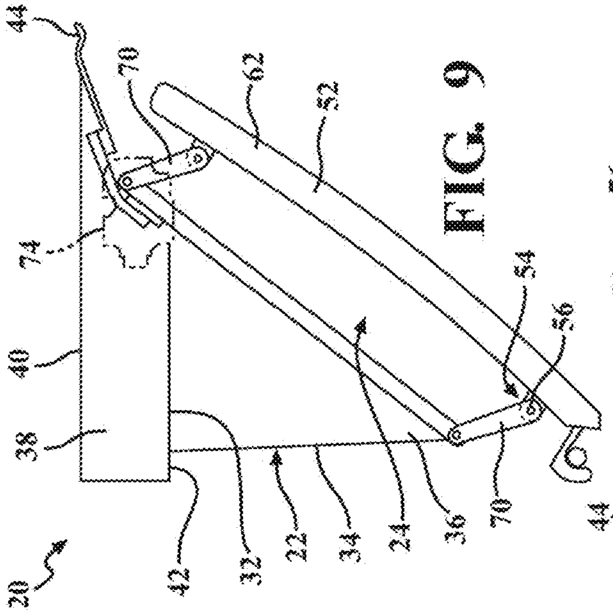
FIG. 9 is side plan view of a glovebox having a storage bin in a second position and a tray in a retracted position according to the present disclosure.
Figure 10:
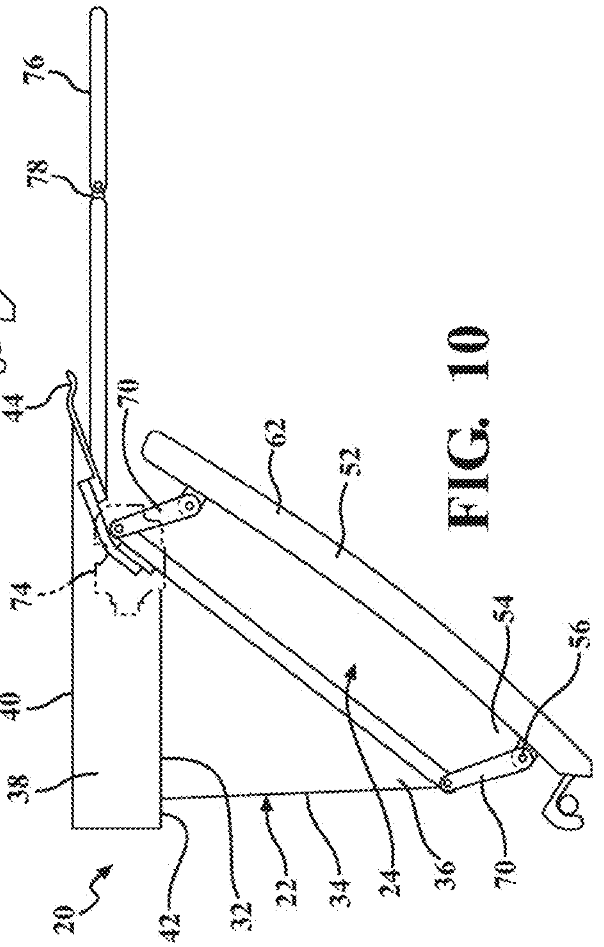
FIG. 10 is side plan view of a glovebox having a storage bin in a second position and a tray in an extended position according to the present disclosure.

Referring to FIGS. 1-10, a glovebox 20 for a vehicle 10 is disclosed. The glovebox 20 includes a frame 22 and a storage bin 24. Generally, as illustrated in FIGS. 1 and 2, the glovebox 20 is used in a vehicle 10. Although an automobile is illustrated in FIG. 1, the vehicle 10 may be any passenger vehicle including but not limited to an air vehicle, a land vehicle, or a water vehicle. As shown in the example shown in FIG. 2, the vehicle 10 may include an interior having a front windshield 28, and an instrument panel 30 disposed below the front windshield 28. The instrument panel 30 extends between the driver's side door and the passenger side door below the windshield 28.

As best shown in FIGS. 3-10, the frame 22 is configured for insertion into the instrument panel 30. In some examples, the frame 22 is fixedly coupled to the instrument panel 30 such that the frame 22 is not movable relative to the instrument panel 30. This configuration allows movement of other components relative to the frame 22 while keeping the glovebox 20 securely coupled to the instrument panel 30. However, various other configurations have been contemplated. Referring still to the example shown in FIGS. 3-10, the frame 22 includes an upper wall portion 32 and a rear wall portion 34 partially defining an interior configured to house the storage bin 24. The upper wall portion 32 and the rear wall portion 34 extend generally perpendicular to each other and are additionally coupled by corresponding side wall portions 36. In the example shown, the upper wall portion 32 and the rear wall portion 34 are generally rectangular with the side wall portions 36 having a triangular shape. In other words, in the example shown, the upper wall portion 32, rear wall portion 34, and side wall portions 36 form half a rectangular prism which is cut on a diagonal. However, various other configurations have been contemplated.

Additionally, the frame 22 includes a tray housing portion 38 disposed on top of the upper wall portion 32. In the example shown, the tray housing portion 38 is generally rectangular in shape having a top wall 40 and a bottom wall 42 coupled to corresponding side walls defining an interior configured to house a tray 76. In some examples, an interior surface of the tray housing portion 38 includes one or more tracks configured to allow the tray 76 to slide thereon. In some examples, one or more of the top wall 40 and the bottom wall 42 have a greater depth than the upper wall portion 32 such that the tray housing portion 38 extends further than the upper wall portion 32. Additionally, in the example shown, the tray housing portion 38 has a smaller width than the upper wall portion 32 to enable additional components to be coupled to the upper wall portion 32. However, various other configurations have been contemplated. Moreover, in some examples, the top wall 40 of the tray housing portion 38 extends further than the bottom wall 42 and forms a flange 44 configured to be coupled to the storage bin 24. The flange 44 may be in line with the remainder of the top wall 40 or may extend from the top wall 40 at an angle, if desired.

Referring still to FIGS. 3-10, in the example shown, the frame 22 includes a pair of curved side extensions 46 which extend outwardly from the sidewall portions 36. In some examples, the side extensions 46 are slightly curved as they extend from the side wall portions 36 toward the top wall 40, however, various other configurations have been contemplated. The curved side extensions 46 are configured to be coupled to the storage bin 24 and enclose the storage bin 24 when the storage bin 24 is in the closed door position. However, various other configurations have been contemplated. Additionally, in some examples, the frame 22 is comprised of steel, however, it is also contemplated that the frame 22 may be comprised of another material including, but not limited to, aluminum or a plastic polymer.

Referring still to the example shown in FIGS. 3-10, the storage bin 24 is coupled to the frame 22 and includes a storage bin base 50 and a storage bin door 52. Additionally, at least a portion of the storage bin 24 is configured to move rotationally between an open door position and a closed door position and configured to move translationally between a first position and a second position, discussed in more detail below.

Referring still to the example shown in FIGS. 3-10, the storage bin base 50 is configured to be directly coupled to the frame 22. Additionally, the storage bin base 50 is configured to be at least partially housed within the frame 22 and disposed below the tray housing portion 38. Moreover, the storage bin 24 is shaped to fit within the interior of the frame 22. The storage bin base 50 also includes a door coupling portion 54 configured to allow the storage bin door 52 to be engaged thereon. In the example shown, the door coupling portion 54 includes a rod 56 extending adjacent between the side wall portions 36 to the rear portion opposite the top portion. The rod 56 is configured to be coupled to the storage bin door 52 and further the rod 56 is configured to allow the storage bin door 52 to rotate thereon. The door coupling portion 54 may also include one or more components of a latch mechanism 68 configured to secure the storage bin door 52 to the storage bin base in the door closed door position. Additionally, the door coupling portion 54 may include additional components and/or be any shape or size corresponding with the storage bin door 52 to ensure an interior 64 of the storage bin 24 is sealed when the storage bin door 52 is in the door closed door position.

The storage bin door 52 includes a bin portion 60 and a door portion 62 fixedly coupled to one another. The bin portion 60 includes an interior surface which defines the interior 64 configured for storage. In the example shown, the interior 64 configured for storage has a generally triangular shape such that a depth of the interior is smaller towards the bottom of the storage bin 24 and becomes gradually larger as it extends towards the top. However, it is contemplated that the bin portion 60 may be any size and shape configured to be coupled with the frame 22 and the storage bin base 50. The door portion 62 includes an exterior 66 having a generally smooth surface configured to match the instrument panel 30. Additionally, the door portion 62 includes the user latch mechanism 68 to secure the door portion 62 to the storage bin base 50 in a closed door position. Moreover, in some examples, the user latch mechanism 68 may engage one or more corresponding components disposed on the storage bin base 50 to secure the door portion 62 to the storage bin base 50 in the closed door position. Additionally, the user latch mechanism 68 includes a user activated portion configured to allow the user to engage the user latch mechanism 68 and move the door portion 62 between the closed door position and the open door position.

Referring still to the example shown in the figures, the storage bin door 52 is movable between a closed door position and an open door position. More specifically, the storage bin door 52 is rotatable relative to the frame 22 between the closed door position and the open door position. As described above, the storage bin door 52 may rotate about the rod 56 of the frame 22 such that the storage bin door 52 is movable relative to the frame 22. As the storage bin door 52 is movable relative to the frame 22, and the frame 22 is fixed within the instrument panel 30, it follows the storage bin door 52 is also rotatable relative to the instrument panel 30 between the closed door position and the open door position. When the storage bin door 52 is in the closed door position, entry into a storage compartment is restricted and when the storage bin door 52 is in the open door position entry into the storage compartment is permitted such the interior of the storage bin 24 is visible.

As illustrated in FIGS. 3-10, the storage bin 24, including the storage bin base 50 and the storage bin door 52 are translatable between the first position and the second position relative to the frame 22 and the instrument panel 30. In some examples, the storage bin 24 is attached to the frame 22 via a linkage configured to permit movement of the storage bin 24 between the first position and the second position. In the example shown, the storage bin 24 is attached to the frame 22 using four bar links 70. Each of the bar links 70 are coupled near each of the four corners of the frame 22 and the storage bin 24. Additionally, one or more of the bar links 70 are coupled to a stepper motor 74 configured to move the storage bin 24 between the first position and the second position. In the example shown, two stepper motors 74 are present and disposed on the upper wall portion 32 on either side of the tray housing portion 38 and coupled to the upper bar links 70. However, various other configurations have been contemplated.

In one of the first position or the second position, the storage bin 24 is engaged with the top wall 40 of the tray housing portion 38 which blocks the tray 76 from moving to the extended position. In the other of the first position or the second position the storage bin 24 has moved translationally away from the top wall 40 of the tray housing portion 38 and is disposed below the bottom wall 42 of the tray housing portion 38 such that the tray 76 is permitted to be moved to the extended position. In one example, the first position is the position which the storage bin 24 is engaged with the top wall 40 of the tray housing portion 38 which blocks the tray 76 from moving to the extended position and the second position is the position which the storage bin 24 has moved translationally away from the top wall 40 of the tray housing portion 38 and is disposed below the bottom wall 42 of the tray housing portion 38 such that the tray 76 is permitted to be moved to the extended position. However, vice versa has also been contemplated.

Referring still to the example shown in FIGS. 1-10, the glovebox 20 also includes the tray 76. In the example shown, the tray 76 is generally rectangular and includes thicker side portions configured to engage the tracks of the tray housing portion 38 and a substantially flat portion. In some examples, the substantially flat portion includes a hinge 78 configured to permit the tray 76 to be folded on itself, see FIGS. 6 and 7. When in use, a user can unfold the tray 76 at the hinge 78 to allow more useable surface space. Additionally, the tray 76 may be any size and shape configured to be housed in the tray housing portion 38.

Moreover, the tray 76 is movable between a retracted state and an extended state. The movement of the tray 76 between the retracted state and the extended state is translational movement. In the retracted state, the tray 76 is completely housed in the tray housing portion 38 and/or in the instrument panel 30 and is not visible to the front vehicle passenger. In the extended state, the tray 76 is extending from the frame 22 and is usable by the front vehicle passenger. Additionally, the tray 76 is movable into the extended state when the storage bin 24 is in one of the first position and the second position and is prevented from moving into the extended state when the storage bin 24 is in the other of the first position and the second position. It is additionally contemplated that the tray 76 may be additionally or alternatively used as a mount for an electronic device such that the electronic device may be coupled to the tray 76 for improved hands-free display.

Referring still to the example shown in FIGS. 1-10, the glovebox 20 includes one or more motors 74 configured to move the tray 76 between the extended position and the retracted position. In the example shown, the motor(s) 74 are disposed on the upper wall portion 32 of the frame 22 and below the tray housing portion 38. However, it is also contemplated that the motor(s) 74 may be disposed in another location as desired. Additionally, in the example shown, the motor(s) 74 are electric motors, such as stepper motors, however, various other motor types may be implemented. In some examples, the motor(s) 74 are user activated such that the glovebox 20 includes a user activated button configured to move the tray 76 between the extended position and the retracted position.

In operation, the glovebox 20 begins with the storage bin door 52 in the closed door position and the storage bin 24 in one of the first position or the second position such that the storage bin 24 is engaged with the top wall 40 of the tray housing portion 38 such that the tray 76 is in the retracted position. When desired, the vehicle passenger may engage the latching mechanism to move the storage bin door 52 from the closed door position to the open door position to access the interior of the storage bin 24. When done accessing the interior of the storage bin 24, the vehicle passenger may push the door back to the closed door position to re-engage the latching mechanism. When the tray 76 is desired, the vehicle passenger may engage the user activated button which activates the motor(s) 74 to move the storage bin 24 to the other of the first position or the second position such that the storage bin 24 is moved below the tray housing portion 38. The motor(s) 74 are then activated to move the tray 76 from the retracted position to the extended position. When desired to return the tray 76 to the retracted position, the user may again engage the user activated button which first activates the motor(s) 74 to move the tray 76 from the extended position to the retracted position. Then the motor(s) 74 are activated to move the storage bin 24 back to the original position such that the storage bin 24 is engaged with the top wall 40 of the tray housing portion 38.

Referring again to the example shown in FIGS. 1-10, the glovebox 20 advantageously provides additional comfort and function to vehicle passengers by providing a dual function glove-box including secured interior storage and an optional tray 76 feature. Moreover, the glovebox 20 fits within traditional glovebox 20 parameters such that space in the instrument panel 30 is not affected by the glovebox 20 allowing for improved comfort and function for the vehicle passenger without sacrificing vehicle safety features.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A glovebox for a vehicle, the glovebox comprising:
- a frame;
- a storage bin translatable between a first position and a second position relative to the frame and rotatable between a closed position and an open position relative to the frame;
- a tray movable between a retracted state and an extended state, wherein the tray extends from the frame in the extended state, and wherein the tray is movable into the extended state when the storage bin is in the first position and is prevented from moving into the extended state when the storage bin is in the second position;
- a motor configured to move the tray back and forth between the extended state and the retracted state; and
- a linkage, wherein the storage bin is attached to the frame via the linkage, wherein the linkage is configured to permit movement of the storage bin between the first position and the second position, and wherein the linkage includes a four-bar link.

2. The glovebox of claim 1, wherein the tray includes at least one hinge configured to permit the tray to be folded on itself.

3. A vehicle incorporating the glovebox of claim 1.

4. A glovebox for a vehicle, the glovebox comprising:
- a frame;
- a storage bin translatable between a first position and a second position relative to the frame, wherein the storage bin is attached to the frame via a linkage configured to permit movement of the storage bin between the first position and the second position, and wherein the linkage includes a four-bar link; and
- a tray movable between a retracted state disposed within the frame and an extended state extending from the frame, the tray movable into the extended state when the storage bin is in one of the first position and the second position and prevented from moving into the extended state when the storage bin is in the other of the first position and the second position.

5. The glovebox of claim 4, wherein the storage bin is rotatable relative to the frame between a closed position and an open position.

6. The glovebox of claim 4, further comprising a motor configured to move the tray between the extended state and the retracted state.

7. The glovebox of claim 4, wherein the tray includes at least one hinge configured to permit the tray to be folded on itself.

8. A vehicle incorporating the glovebox of claim 4.

9. A vehicle comprising:
- an instrument panel;
- a door rotatable relative to the instrument panel between a closed position restricting entry into a storage compartment and an open position permitting entry into the storage compartment, the door translatable between a first position and a second position relative to the instrument panel, wherein the storage compartment is coupled to the instrument panel via a linkage configured to permit movement of the storage compartment between the first position and the second position, and wherein the linkage includes a four-bar link; and a tray disposed within the instrument panel and movable between a retracted position disposed within the instrument panel and an extended position extending from the instrument panel, the tray prevented from moving from the retracted position into the extended position by the door when the door is in one of the first position and the second position and permitted to move from the retracted position into the extended position when the door is in the other of the first position and the second position.

10. The vehicle of claim 9, further comprising a motor configured to move the tray between the extended position and the retracted position.

11. The vehicle of claim 9, wherein the tray includes at least one hinge configured to permit the tray to be folded on itself.

* * * * *